No. 898,199. PATENTED SEPT. 8, 1908.
W. EISENMANN.
HOSE AND PIPE COUPLING.
APPLICATION FILED MAY 13, 1907.
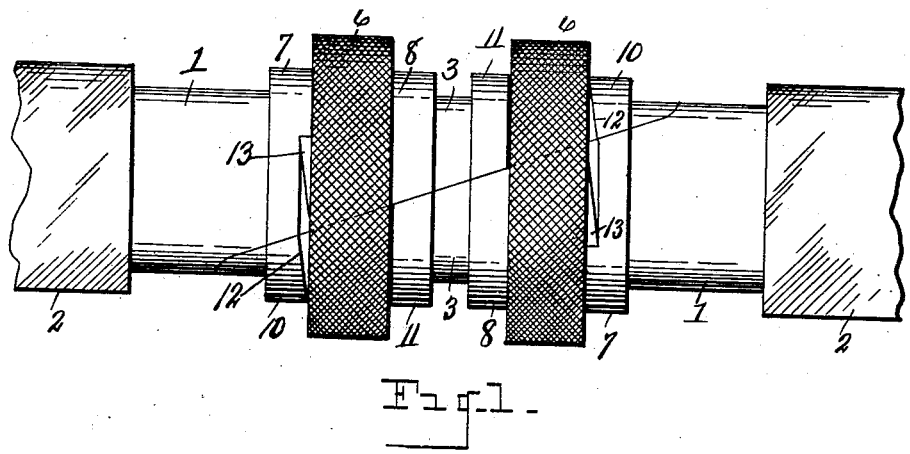
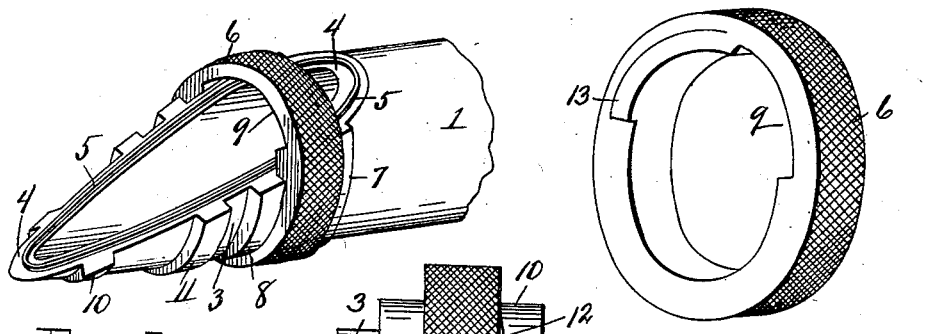
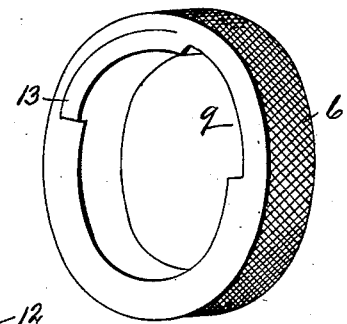
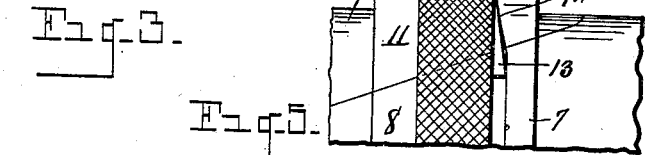
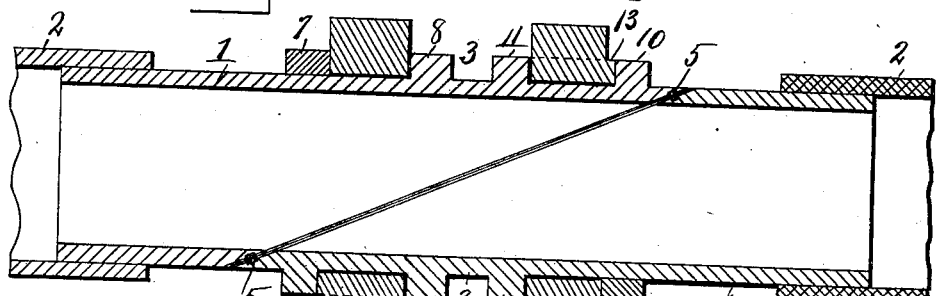
Witnesses
O. B. Baenziger
J. G. Howlett
Inventor
Wenzl Eisenmann
By E. S. Wheeler & Co.
Attorneys

UNITED STATES PATENT OFFICE.

WENZL EISENMANN, OF FORD CITY, MICHIGAN.

HOSE AND PIPE COUPLING.

No. 898,199.  Specification of Letters Patent.  Patented Sept. 8, 1908.

Application filed May 13, 1907. Serial No. 373,216.

*To all whom it may concern:*

Be it known that I, WENZL EISENMANN, a citizen of the United States, residing at Ford City, in the county of Wayne, State of Michigan, have invented certain new and useful Improvements in Hose and Pipe Couplings; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to new and useful improvements in hose and pipe couplings, and consists in the construction and arrangement of parts hereinafter more fully set forth and claimed.

The object of the invention is to provide a coupling of the character described of comparatively simple and inexpensive construction in which the arrangement is such as to enable the ends of sections of hose to be quickly and securely coupled so as to effect a joint sufficiently tight to prevent leakage, and wherein the arrangement is such as to enable the parts to be readily uncoupled, when desired, obviating the use of all screw threads in effecting a union of the coupling parts, and also obviating undue exterior projections.

The above object is attained by the structure illustrated in the accompanying drawings, in which:—

Figure 1 is an elevation of my improved coupling, showing the parts in the initial position when placed together preparatory to being locked by a rotation in opposite directions of the embracing collars. Fig. 2 is a longitudinal section through the coupling. Fig. 3 is a perspective view of one of the coupling parts. Fig. 4 is a perspective view of one of the rotatable locking collars. Fig. 5 is a fragmentary view in elevation, showing the wedge on one of the collars of one of the coupling parts in engagement with the beveled face of a flange on the other of said parts, as when the parts of the coupler are locked or clamped together.

Referring to the characters of reference, 1 designates the tubular members that are attached to the ends of the hose sections 2. Each of said members form a complementary part of the coupling head when placed together to couple the ends of the hose sections.

Each of the tubular members as will be seen is provided with a beveled end 3 having a flat face 4 in which may be seated a suitable washer or gasket 5 which surrounds the opening through said member. The bearing faces on the opposite members of the coupling head are the exact counterpart of each other and are adapted to register perfectly when placed together, and form a closed joint between said parts, the efficiency of which joint is increased by the interposed gaskets 5. When the beveled faces of the tubular members 1 are placed together, a continuity of the passage through said parts is established, and a connection made between the hose sections 2. To clamp the beveled faces of said parts tightly together and establish a joint capable of resisting such internal pressure as the hose or pipe is designed to carry, there are employed upon the beveled ends of said members the rotatable collars 6 which are confined between the segmental flanges 7 and 8 upon the exterior of each of said coupling members, said collars being adapted to embrace the extreme ends of the beveled points of the other of said members. Each of the collars as will be seen on referring to Figs. 3 and 4, is cut away upon its inner face, as shown at 9, to enable the small segmental flange 10 on the extreme end of each of the beveled parts to pass through the embracing collar and allow the succeeding larger segmental flange 11 of each of the beveled parts to engage the inner faces of said collars, an arrangement which permits the beveled faces of the tubular members to be placed together in the initial act of effecting a coupling of the parts, as illustrated in Fig. 1.

It will be noted that the inner faces of the segmental flanges 10 are beveled, as at 12, and that each of the rotatable collars 6 is provided with an integral curved wedge 13 projecting outwardly from the outer edges thereof. By a rotation of said collars in opposite directions, said wedges will be brought into engagement with the inclined faces 12 of the segmental flanges 10, whereby the beveled faces of the parts will be drawn tightly together, and the coupling members securely locked in engagement. To disengage the coupler, the collars 6 are turned to carry the wedges from engagement with the flanges 10, which movement of said collars also causes the openings 9 formed in the inner walls thereof to register with said lastmentioned flanges, when by drawing outwardly upon the tubular members of the coupling, the parts may be separated as will be well understood. It will be noted that the operation of uncoupling the parts leaves them in a position to be recoupled by simply placing the beveled faces thereof together, as before described, and rotating the collars to effect a coupling of the parts. The rotary movement of the collars to clamp the parts together is so slight, that a coupling of the parts may be quickly made, while the strength of the embracing collars is such as to insure a perfect and rigid union of the parts.

To enable the rotary collars to be placed in position on the tubular members of the coupler, the segmental flanges 7 are made separate to allow said collars to be slid into place over the outer ends of said members, when said flanges are properly positioned and brazed or welded into place.

Having thus fully set forth my invention, what I claim as new and desire to secure by Letters Patent, is:—

1. In a pipe coupling, the combination with the tubular pipe members having straight beveled faces at the ends thereof, of a rotatable collar mounted on each of said members and adapted to embrace the ends of both members, and coöperating means carried by said collars and pipe members for clamping the parts together by a partial rotation only of said collars.

2. In a pipe coupling, the combination with the tubular pipe members having straight oblique bearing faces at the meeting ends thereof adapted to effect a joint between the parts when placed together, of a rotatable collar upon each of said members, each of said collars adapted to embrace both members and each having a wedge-shaped portion, and a segmental flange upon each of said members having a beveled face adapted to be engaged by one of said wedge shaped projections as said collars are partially rotated.

3. In a coupling, the combination with tubular members having lapping beveled end portions whose straight meeting faces are adapted to effect a joint between said members, of rotatable collars mounted upon and embracing the lapping ends of said members through which collars the beveled end portions of the members extend, and means upon said collars and pipes for clamping the beveled faces of the members together as said collars are rotated.

4. In a coupling, the combination with the tubular members having straight beveled faces at the ends thereof, adapted to be brought into engagement by a direct longitudinal movement of said parts, each of said members having at its extreme end a segmental flange provided with a beveled face, a rotatable collar loosely mounted upon the beveled end portion of each of said tubular members under which the extreme end of the opposing part passes when said parts are placed together, each of said collars having a wedge shaped projection extending from the outer edge thereof adapted by a partial rotation of said collars to engage the beveled face of the segmental flange of the opposite part to lock the coupling members together.

5. In a coupling, the combination with the tubular members having lapping beveled end portions whose straight faces when placed together effect a joint between said parts, each of said tubular members having a rotary collar embracing the beveled end portion thereof and the beveled end portion of each of said parts having at its extreme end a segmental flange, each of said rotary collars having a channel in its inner face for the passage of said flange of the other part to enable the beveled faces of said parts to be placed together and to project through said collars, and co-acting means upon the beveled end portion of said parts and upon said collars for clamping the beveled faces of the parts together as said collars are partially rotated.

In testimony whereof, I sign this specification in the presence of two witnesses.

WENZL EISENMANN.

Witnesses:
E. S. WHEELER,
I. G. HOWLETT.